United States Patent [19]
Okura

[11] Patent Number: 5,926,602
[45] Date of Patent: Jul. 20, 1999

[54] TIME-BASE CORRECTOR CIRCUIT CAPABLE OF ADDING COLOR BURST SIGNAL TO OUTPUT SIGNAL BASED ON KIND OF INPUT VIDEO SIGNAL

[75] Inventor: Jiro Okura, Katano, Japan

[73] Assignee: Sanyo Electric Co., Ltd., Osaka, Japan

[21] Appl. No.: 08/680,417

[22] Filed: Jul. 15, 1996

[30] Foreign Application Priority Data

Jul. 13, 1995 [JP] Japan .................................... 7-177583
Aug. 1, 1995 [JP] Japan .................................... 7-196599

[51] Int. Cl.$^6$ ........................................................ H04N 9/89
[52] U.S. Cl. .................................. 386/13; 386/19; 386/8; 386/2
[58] Field of Search ............................... 386/1, 8, 10, 12, 386/13, 17, 18, 19, 14, 121, 20, 26, 2, 3, 11; 348/565, 505, 506, 507, 508, 510, 512, 513, 514; H04N 9/88, 9/89

[56] References Cited

U.S. PATENT DOCUMENTS

| | | | |
|---|---|---|---|
| 4,737,861 | 4/1988 | Sekimoto | 386/14 |
| 4,774,832 | 10/1988 | Hakamada et al. | 348/565 |
| 5,194,964 | 3/1993 | Kawai | 386/10 |

*Primary Examiner*—Huy T. Nguyen
*Attorney, Agent, or Firm*—Loeb & Loeb LLP

[57] ABSTRACT

A memory controller which controls writing/reading operation to/from a memory in a TBC circuit prohibits writing operation to the memory circuit in response to an activation of a frame grab signal after an A/D converted video signal for one frame is stored in the memory circuit. A color demodulator detects whether or not a color burst signal is added to a video signal input at the time at which the frame grab signal is activated, and the result of detection is held in a flip-flop circuit. In response to a signal from the flip-flop circuit, a color burst signal is added to a video signal output from an encoder.

3 Claims, 14 Drawing Sheets

TIME-BASE CORRECTOR CIRCUIT CAPABLE OF ADDING COLOR BURST SIGNAL TO OUTPUT SIGNAL BASED ON KIND OF INPUT VIDEO SIGNAL

BACKGROUND OF THE INVENTION

1. Field of the Invention

The present invention relates generally to time-base corrector circuits for time-base correction of a video signal, and more particularly to a time-base corrector circuit having the function of storing a video signal and outputting a still picture based on the signal.

2. Description of the Background Art

Appliances such as VTR generally record/reproduce information by means of high-speed contacting between the reproducing head and a recording tape, and therefore, the time-base of a reproduced signal may vary. This phenomenon is called jitter.

Meanwhile, a color component of an NTSC television signal is, for example, formed of orthogonally modulated chrominance subcarriers, and the phases of chrominance subcarriers convey information. More specifically, the phases correspond to hues. If, therefore, the phases of chrominance subcarriers are shifted by a jitter, correct hues cannot be reproduced.

A circuit for removing such a jitter from a reproduced signal is a so-called time-base corrector circuit (hereinafter referred to as TBC circuit).

FIG. 17 is a schematic block diagram showing the structure of a conventional TBC circuit.

The TBC circuit should generally perform signal processings for luminance signals and color signals. However, since the present invention is directed to color-related signal processings, the components for luminance-related signal processings are omitted, and only the color-related signal processings are detailed.

"Color carrier signal" in the following is produced by subjecting two chrominance subcarriers having the same frequency and a phase difference of 90° from each other to orthogonal-binary-phase-modulation with separate color difference signals R-Y and B-Y and combining them.

A TBC circuit 600 includes a color modulator 1 for outputting color difference signals R-Y and B-Y based on a received video signals input. Herein, signal R represents a signal corresponding to color red, signal B represents a signal corresponding to blue, signal Y represents a luminance signal, signal R-Y a first color difference signal, and B-Y a second color difference signal.

TBC circuit 600 further includes an A/D converter 2 converting a received signal R-Y into a digital signal, an A/D converter 3 converting a received signal B-Y into a digital signal, a synchronizing signal separation circuit separating a horizontal synchronizing signal HW and a vertical synchronizing signal VW in a video signal, and a memory controller 8 for controlling the operations of A/D converters 2 and 3 in synchronization with these separated horizontal synchronizing signal HW and vertical synchronizing signal VW.

TBC circuit 600 further includes a memory circuit 4 controlled by memory controller 8 for receiving and storing the digital signals output from A/D converters 2 and 3, a reference signal generator 11 outputting to memory controller 8 a horizontal synchronizing reference signal HR and a vertical synchronizing reference signal VR corresponding to a read clock and generating a chrominance subcarrier SC, D/A converters 5 and 6 controlled by memory controller 8 for converting the digital signals from memory circuit 4 into analog signals, R-Y signal and B-Y signal.

TBC circuit 600 further includes an encoder 7 for adding color burst signals to signals R-Y and B-Y output from D/A converters 5 and 6, respectively, based on a burst flag pulse BFP output from reference signal generator 11.

Herein, the color burst signal functions as a phase reference for a color carrier signal conveying a color difference signal, upon reproducing a color signal in a video signal.

FIG. 18 is a waveform chart showing a horizontal blanking period being enlarged within a video signal waveform according to NTSC standards. The portion before the horizontal synchronizing signal is called front porch, and the portion after is called back porch. Since the color television system has been developed following the monochrome television system, a color burst signal to be a phase reference for a carrier color signal is overlayed taking advantage of the period of the back porch, in order to maintain compatibility with a monochrome video signal.

In the conventional TBC circuit 600, a color difference signal is A/D-converted in synchronization with a clock signal having a jitter the same as a reproduced video signal and then written in memory circuit 4. More specifically, a color difference signal corresponding to each pixel is written at an address in the memory corresponding to each position in the frame, and therefore most of the jitter will have been removed as the color difference signal is written in memory circuit 4.

As described above, the color difference signal written in memory circuit 4 is read out from memory circuit 4 in synchronization with signals HR and VR having stable phases, digital-analog converted and output, and therefore a resultant video signal will not be affected by the jitter even if the time base of the video signal is shifted at the time of reproduction.

Among such TBC circuits for time-base correction of a video signal, some perform signal processings after demodulating color signals in a video signal into color difference signals as described above, and others directly processes a composite video signal including a synchronizing signal, a color carrier signal and a color burst signal as disclosed by Japanese Patent Laying-Open No. 63-171094.

Some of the former TBC circuits have the function of taking in a still picture for output. Such a TBC circuit is generally designed such that if a monochrome video signal without a color burst signal is input as an input video signal, an output video signal is always added with a burst signal.

One of the reasons for always adding a color burst signal to an output video signal is as follows. Color demodulator 1 in a preceding stage to the memory demodulates a color signal and outputs a color difference signal with horizontal blanking. More specifically, only the signal portion corresponding to the scanning period among the video signal is output, and the signal corresponding to the horizontal blanking period is not stored in memory circuit 4. As a result, information about the presence/absence of a color burst signal is dropped from the signal input to memory circuit 4.

Therefore, in a succeeding stage to memory circuit 4, a color burst signal is added irrespectively of whether or not a color burst signal is present in an input video signal when the video signal is encoded.

Such a structure, however, adds a color burst signal to a monochrome video signal, and minute rainbow-like noises appear in a picture output at the TV receiver, which may degrade the resolution.

Meanwhile, video signals for a VTR, for example, are edited while dubbing the information into separate tapes for every cut, in other words, a so-called electronic editing is generally performed. In such electronic editing, scenes cut out from the initially cut out original tape on which the program is based are arranged in an appropriate order, in other words, an assemble editing is carried out. In such a case, a black burst tape which prerecords a black burst signal, i.e., a black level video signal having a synchronizing signal and a burst signal should be produced before editing. The scenes cut out from the original tape are dubbed to the black burst tape further recorded with time codes.

According to a conventional method, the black burst tape is produced by recording a tape with a black burst signal generated using a video signal generation circuit having an oscillator.

Meanwhile, some TBC circuits for time-base correction of a video signal have the function of outputting a video image taken into the memory in the form of a still picture. Such a TBC circuit includes reference signal generator 11, by which a color burst signal is generated and added to a video signal. Japanese Patent Laying-Open No. 62-287780 discloses a TBC circuit which outputs a black burst signal by switching an output signal to a blanking signal when a video signal is not input.

However, if a black burst tape for editing is produced using a conventional VTR device, such a black burst signal cannot be generated in a desired timing based on the idea of the editor.

SUMMARY OF THE INVENTION

It is an object of the present invention to provide a TBC circuit free from color noises when a monochrome video signal output from the TBC circuit and having its time base corrected is reproduced at a TV receiver.

Another object of the invention is to provide a TBC circuit capable of generating a black burst signal in response to an external instruction and permitting a black burst tape to be produced.

The present invention is directed to a time-base corrector circuit for time-base correction of a video signal, which includes a synchronizing signal separation circuit, a color signal demodulation circuit, an A/D conversion circuit, a storing porion, a reference signal generation circuit, a D/A conversion circuit, and a burst signal addition circuit. The synchronizing signal separation circuit separates a synchronizing signal from a received video signal. The color signal demodulation circuit receives the video signal and reproduces color signals. The color signal demodulation circuit includes a burst detection circuit for detecting the presence/absence of a color burst signal in the video signal. The A/D conversion circuit converts a received color signal into a digital signal in synchronization with a synchronizing signal. The storing portion stores a received digital signal in synchronization with a synchronizing signal. The reference signal generation circuit outputs a reference frequency signal. The D/A conversion circuit reads out a digital signal from the storing portion in synchronization with the reference frequency signal and converts the read out digital signal into an analog signal. The burst signal addition circuit adds a color burst signal to an output signal from the D/A conversion circuit in synchronization with the reference frequency signal based on the result of detection by the burst detection circuit.

In another aspect of the invention, the time-base correction circuit having the function of outputting a still picture includes a reference signal generation circuit, a synchronizing signal separation circuit, a color signal demodulation circuit, an A/D conversion circuit, a storing portion, a control circuit, a D/A conversion circuit, and a burst signal addition circuit. The reference signal generation circuit outputs a reference frequency signal. The synchronizing signal separation circuits separates a synchronizing signal from a received video signal. The color signal demodulation circuit receives a video signal and reproduces the color signal. The color signal demodulation circuit includes a burst detection circuit for detecting the presence/absence of a color burst signal in a video signal. The A/D conversion circuit converts a received color signal into a digital signal in synchronization with a synchronizing signal. The storing portion stores a received digital signal. The control circuit controls writing operation of a digital signal into the storing portion in synchronization with a synchronizing signal, and controls reading operation of a digital signal from the storing portion is in synchronization with the reference frequency signal. The control circuit responds to an activation of an externally applied control signal and prohibits writing operation to the storing portion after a digital signals corresponding to a video signals for one picture frame is stored in the storing portion. The D/A conversion circuit sequentially reads digital signals from the storing portion in synchronization with the reference frequency signal and converts the read out digital signals into analog signals. The burst signal addition circuit adds a color burst signal to an output signal from the D/A conversion circuit in synchronization with the reference frequency signal based on the result of detection by the burst detection circuit.

In yet another aspect of the present invention, the time-base correction circuit having the function of outputting a still picture includes a reference signal generation circuit, a video signal input terminal, a video signal input detection circuit, internal synchronizing signal generation circuit, a color signal demodulation circuit, an A/D conversion circuit, a storing portion, a control circuit, a D/A conversion circuit, and a burst signal addition circuit. The reference signal generation circuit outputs a reference frequency signal. The video signal input terminal receives an externally applied video signal. The video signal input detection circuit detects the presence/absence of input of a video signal to the video signal input terminal. The internal synchronizing signal generation circuit receives a signal from the video signal input terminal and outputs an internal synchronizing signal. The synchronizing signal generation circuit outputs an internal synchronizing signal by separating a synchronizing signal from a video signal when the video signal is input, and outputs an internal synchronizing signal of a prescribed frequency if no video signal is input. The color signal demodulation circuit receives a video signal and reproduces a color signal. The color signal demodulation circuit reproduces color signals from a video signal if the video signal is input, and outputs a color signal corresponding to a black level if no video signal is input. The A/D conversion circuit receives a color signal and converts the signal into a digital signal in synchronization with a synchronizing signal. The storing portion stores a received digital signal. The control circuit controls writing operation of the digital signal to the storing portion in synchronization with an internal synchronizing signal, and controls reading operation of a digital signal from the storing portion in synchronization with a reference frequency signal. The control circuit responds to an activation of an externally applied control signal, clears storage information in the storing portion, and then prohibits writing operation to the storing portion. The D/A conversion circuit sequentially reads out digital signals from the storing portion in synchronization with a reference frequency signal and converts thus read out digital signals into analog signals. The burst addition circuit responds to the result of detection by the video signal input detection circuit and adds a color burst signal to an output signal from the D/A conversion circuit in synchronization with the reference frequency signal if no video signal is input.

A main advantage brought about by the present invention is that a color burst signal is added to a video signal to be output based on the result of detection of the presence/absence of a color burst signal in an input video signal by the burst detection circuit, and a color burst signal is not added to a video signal to be output if the input video signal is a monochrome video signal. More specifically, no color noise is encountered if a monochrome video signal output from the TBC circuit is reproduced at the TV receiver.

Another advantage brought about by the invention is that a color burst signal is added to a video signal to be output based on the presence/absence of a color burst signal in an input video signal at the time of outputting a still picture, and therefore color noise is not generated if a still picture corresponding to a monochrome video signal is reproduced at the TV receiver.

Yet another advantage brought about by the present invention is that a black burst signal is output from the TBC circuit in response to an activation of an externally applied control signal with no external video signal input, and therefore a black burst tape may be produced at arbitrary time as desired by the editor.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
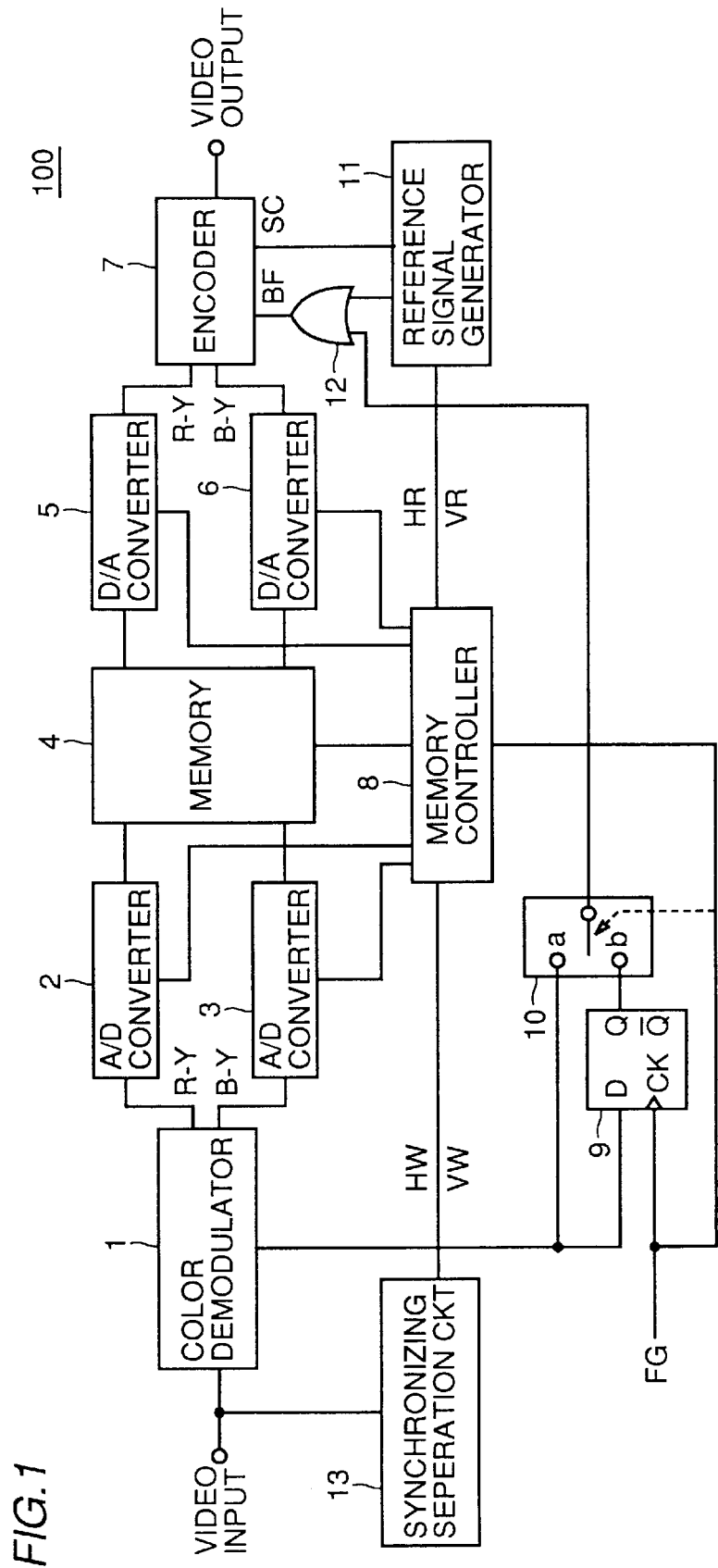
FIG. 1 is a schematic block diagram showing the structure of a TBC circuit according to a first embodiment of the invention.

FIG. 1 is a schematic block diagram showing the structure of a TBC circuit 100 according to a first embodiment of the invention.

TBC circuit 100 includes a color demodulator 1 for producing color difference signals R-Y and B-Y based on a received video signal input and outputting a killer out signal according to the presence/absence of a color burst signal in the input video signal, a synchronizing signal separation circuit 13 for separating a horizontal synchronizing signal HW and a vertical synchronizing signal VW from a received input video signal, a reference signal generator 11 outputting a horizontal synchronizing reference signal HR, a vertical synchronizing reference signal VR, a BF pulse indicating a timing of adding a burst signal, and a chrominance subcarrier (SC signal), a memory controller 8 receiving horizontal synchronizing signal HW, vertical synchronizing signal VW, horizontal synchronizing reference signal HR and vertical synchronizing reference signal VR, an A/D converter 2 controlled by memory controller 8 for analog-digital converting a received color difference signal R-Y in synchronization with signals HW and VW, an A/D converter 3 controlled by memory controller 8 for analog-digital converting a received color difference signal B-Y in synchronization with signals HW and VW, and a memory circuit 4 controlled by memory controller 8 for storing outputs from A/D converters 2 and 3.

TBC circuit 100 further includes a D/A converter 5 controlled by memory controller 8 for digital-analog converting an output received from memory circuit 4 to produce signal R-Y in synchronization with signals HR and VR for output, a D/A converter 6 controlled by memory controller 8 for digital-analog converting an output received from memory circuit 4 into color difference signal B-Y in synchronization with signals HR and VR, a flip-flop circuit 9 receiving an externally applied frame grab signal (hereinafter referred to as FG signal) as a clock signal and receiving a killer out signal from color demodulator 1 as data, a switch circuit 10 receiving the killer out signal and an output from flip-flop circuit 9 and outputting the killer out signal during the period in which FG signal is inactive and the output from flip-flop circuit 9 during the period in which FG signal is active, an OR circuit 12 outputting a signal BF based on an output from switch circuit 10 and a burst flag pulse BFP received from reference signal generator 11, and an encoder 7 receiving color difference signals R-Y and B-Y from D/A converters 5 and 6 and a chrominance subcarrier and producing a color modulation signal from the color difference signals based on signal BF.

Memory controller 8 prohibits data writing operation to memory circuit 4 in response to an activation of signal FG after writing operation of data for 1 frame to memory circuit 4 completes.

Now, the operations of each portion of TBC circuit 100 will be detailed.

Color demodulator 1 converts a color signal modulated with a carrier into color signals R-Y and B-Y in the baseband.

Color demodulator 1 includes a color APC (Automatic Phase Control) circuit which has a color killer circuit.

The color killer circuit has a similar configuration to a circuit for preventing color noises from being generated in a monochrome picture by automatically stopping amplification operation of a chrominance carrier signal if monochrome broadcasting is received in a color signal reproduction circuit in a TV set, for example. More specifically, the color killer circuit detects the presence/absence of a burst signal in an input signal, and outputs a killer out signal based on the result. The color killer signal attains an "H" level if an input video signal has no color burst signal, in other words if the input video signal is a monochrome video signal, and an "L" level if the input video signal has a color burst signal, in other words if the input video signal is a color video signal.

A/D converters 2 and 3 quantize the demodulated color difference signals, for example, with a quantizing precision of 8 bits.

Memory circuit 4 is a 512×525×8 bit DRAM, for example, and holds quantized color signals output from A/D converters 2 and 3.

D/A converters 5 and 6 convert digital signals read out from memory circuit 4 into analog signals.

Encoder 7 converts color difference signals R-Y and B-Y into the original color modulation signal.

Encoder 7 is supplied from reference signal generator 11 with chrominance subcarrier SC and burst flag pulse BFP necessary for the color modulation If signal BF in response to burst flag pulse BFP is no longer supplied, encoder 7 stops the operation of adding a color burst signal to an input signal.

Memory controller 8 is a logic circuit for permitting outputs from A/D converters 2 and 3 to be written in memory circuit 4 in synchronization with synchronizing signals HW and VW in an input video signal and generating a pulse for controlling the operation of sending read out information to A/D converters 5 and 6.

D flip-flop circuit 9 latches a D input signal in response to an activation of a CK input, signal FG.

Analog switch 10 has its "a" side selected if a signal input to its control terminal is at an "L" level, and its "b" side selected at an "H" level.

Reference signal generator 11 supplies a clock pulse to encoder 7 and memory controller 8.

OR gate 12 outputs to encoder 7 a logical sum of outputs from analog switch 10 and reference signal generator 11 as signal BF.

Synchronizing signal separation circuit 13 separates horizontal synchronizing signal HW and vertical synchronizing signal VW in an input video signal for output.

Figure 3:
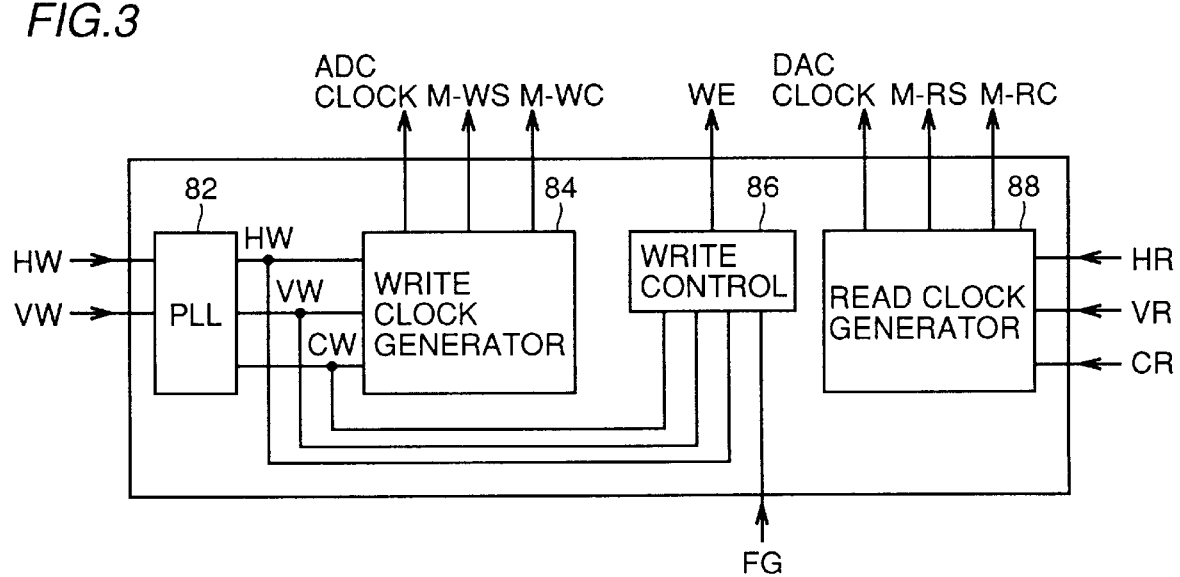
FIG. 3 is a schematic block diagram showing the structure of a memory controller 8 in the TBC circuit.

FIG. 3 is a schematic block diagram showing the structure of memory controller 8 in TBC circuit 100 shown in FIG. 1.

Memory controller 8 includes a PLL circuit 82 receiving horizontal synchronizing signal HW and vertical synchronizing signals VW separated by synchronizing signal separation circuit 13 and supplying signals HW, VW and a master clock CW to a write clock generation circuit 84, an ADC clock for controlling the operations of A/D converters 2 and 3, write clock generation circuit 84 outputting signal M-WS, a pulse having a cycle of 1 frame of a video signal, and a memory write clock M-WC, a write control circuit 86 receiving signals HW, VW and CW and outputting a signal WE controlling writing operation to memory circuit 4 in response to signal FG, a DAC clock receiving signal HR, VR and master clock pulse CR from reference signal generator 11 and controlling reading operation from memory circuit 4, and a read clock generation circuit 88 outputting signals M-RS and M-RC. Herein, the DAC clock controls the operations of D/A converters 5 and 6, signal M-RS is a pulse instructing a timing of starting reading from the first address in memory 4, and signal M-RC a clock controlling reading operation from memory circuit 4.

Figure 4:
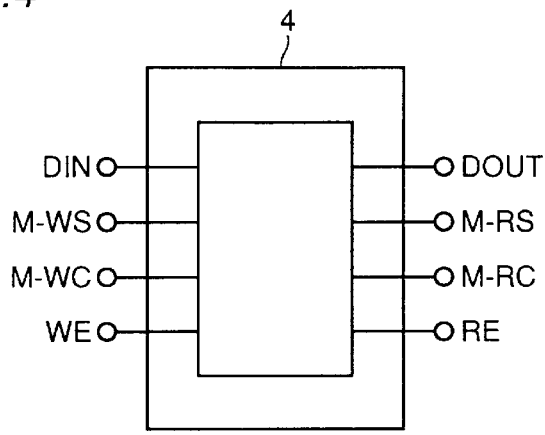
FIG. 4 is a diagram showing the arrangement of input/output pins in the memory circuit in the TBC circuit.

FIG. 4 is a diagram showing the arrangement of data input/output terminals in memory circuit 4. Memory circuit 4 has a data input/output arrangement for a so-called dual-port video frame memory. Herein, the dual-port video frame memory shown in FIG. 4 is arranged for each of color difference signals R-Y and B-Y.

Data input/output terminal DIN receives an output signal from A/D converter 2 or 3. DOUT terminal outputs a signal to D/A converter 5 or 6.

If signal WE attains an "H" level, writing operation to the dual-port video frame memory is ineffected and at an "L" level, writing operation is enabled.

Meanwhile, during the period in which signal RE is at an "H" level, reading operation is ineffected, and during the period in which signal RE is at an "L" level, reading operation is enabled.

Figure 5:
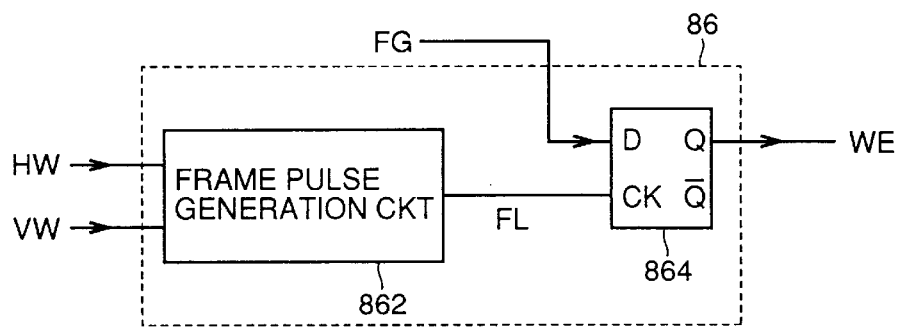
FIG. 5 is a schematic block diagram showing the structure of a write control signal generation circuit in memory controller 8.

FIG. 5 is a schematic block diagram showing the structure of write control circuit 86 shown in FIG. 3.

Write control circuit 86 includes a frame pulse generation circuit 862 outputting a frame pulse FL indicating a period corresponding to one frame of a video signal in response to signals HW and VW, and a flip-flop circuit 864 holding the value of signal FG in its active state and outputting the value in signal WE in response to frame pulse FL received as a clock signal.

Herein, frame pulse generation circuit 862 outputs frame pulse FL at a prescribed cycle if signals HW and VW are not input.

Such structure permits the level of write control signal WE to be unchanged until frame pulse FL is activated even if signal FG attains an active state (H" level).

An input video signal for one frame starts to be input from the first address in memory circuit 4, and the level of signal WE changes at the point where one frame completes.

Thus, the rising edge of signal WE which changes corresponding to signal FG input in an arbitrary timing with respect to the video signal may be synchronized with frame pulse FL.

Figure 6:
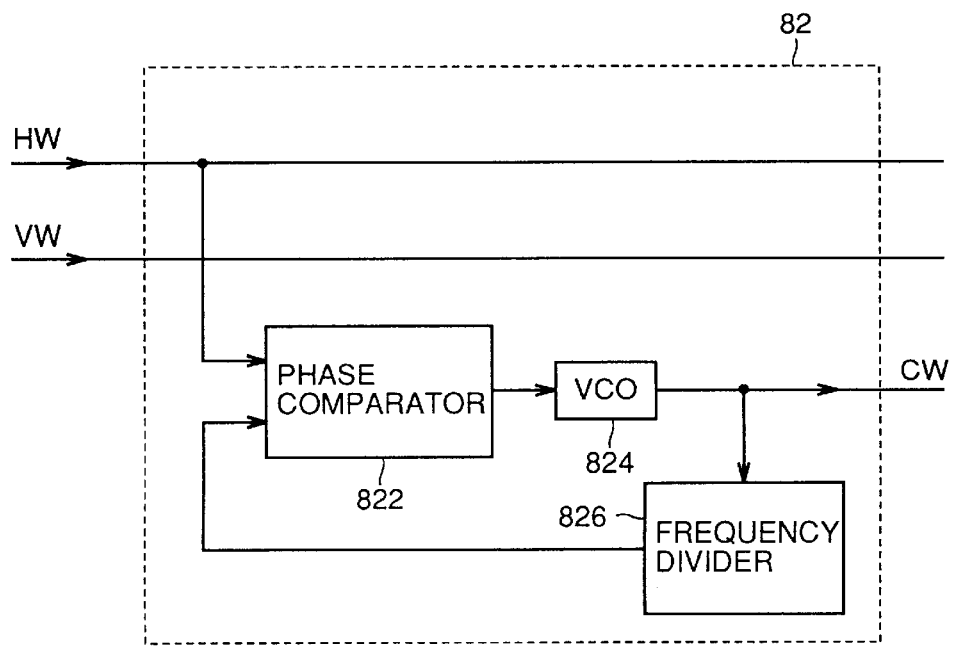
FIG. 6 is a schematic block diagram showing the structure of a write clock generation circuit in a memory controller 8.

FIG. 6 is a schematic block diagram showing the structure of PLL circuit 82 shown in FIG. 3.

PLL circuit 82 includes a phase comparator 822 receiving horizontal synchronizing signal HW as a first input, a VCO circuit 824 having its oscillation frequency controlled by phase comparator 822, and a frequency divider 826 frequency-dividing the output of VCO circuit at a prescribed dividing factor of 1/910, for example, and providing the resulting signal to the phase comparator as a second input.

VCO circuit 824 is a voltage-controlled oscillator which oscillates around at a frequency of 14.31818 MHz in the case of a video signal according to NTSC standards, in which the oscillation frequency is controlled such that input horizontal synchronizing signal HW is synchronized in phase with a signal resulting from dividing the output signal CW of VCO circuit 824 by a factor of 1/910.

Figure 7:
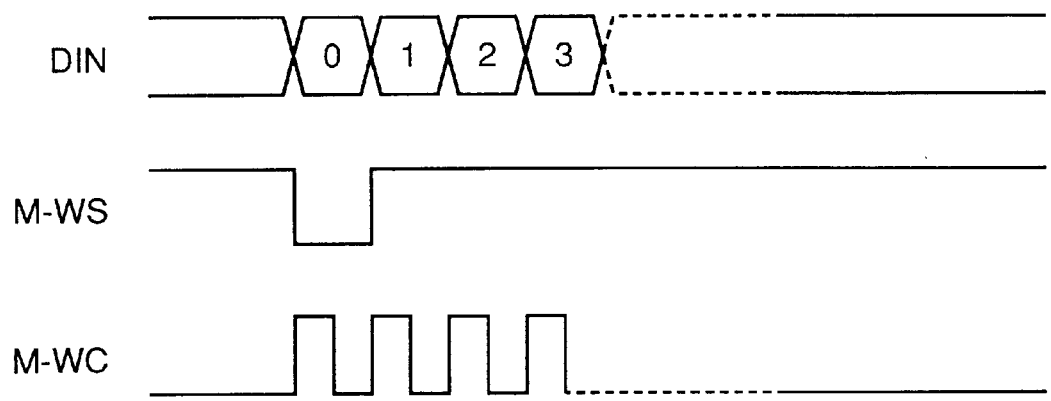
FIG. 7 is a timing chart for use in illustration of writing operation of data in memory circuit 4.

FIG. 7 is a timing chart for use in illustration of writing operation of data to memory circuit 4.

In response to an active state ("L" level) of signal M-WS, a starting timing for writing data is specified, and then data is written from data input terminal DIN to memory circuit 4 in synchronization with the toggle cycle of signal M-WC.

Herein, signals M-WS and M-WC are produced in synchronization with horizontal synchronizing signal HW and vertical synchronizing signal VW in an input video signal as described above.

If, therefore, a jitter is present in an input video signal, a color difference signal corresponding to each pixel is written in an address in the memory corresponding to the position within the picture when the data is written in memory circuit 4, and the influence of the jitter in the input video signal is eliminated.

Figure 8:
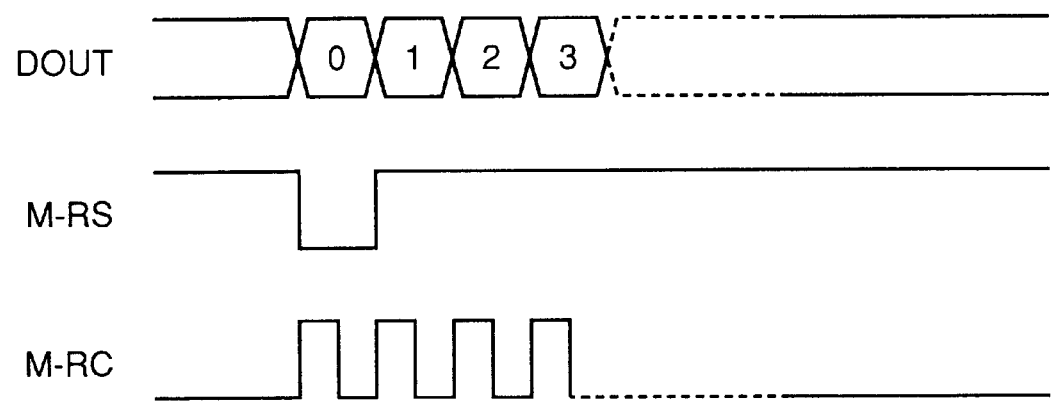
FIG. 8 is a timing chart for use in illustration of reading operation of data from memory circuit 4.

FIG. 8 is a timing chart for use in illustration of reading operation of data from memory circuit 4.

In response to an active state ("L" level) of signal M-RS, a starting timing for reading data from the first address in memory circuit 4 is specified. Data is thereafter read out in synchronization with the toggle of signal M-RC.

Herein, signals M-RS and M-RC are in synchronization with signals HR and VR output from the reference signal generator 11 of TBC circuit 100, and therefore data may be read out in a stable phase irrespective of a jitter in an input video signal.

Now, the operation of TBC circuit 100 as a whole will be described.

Figure 2:
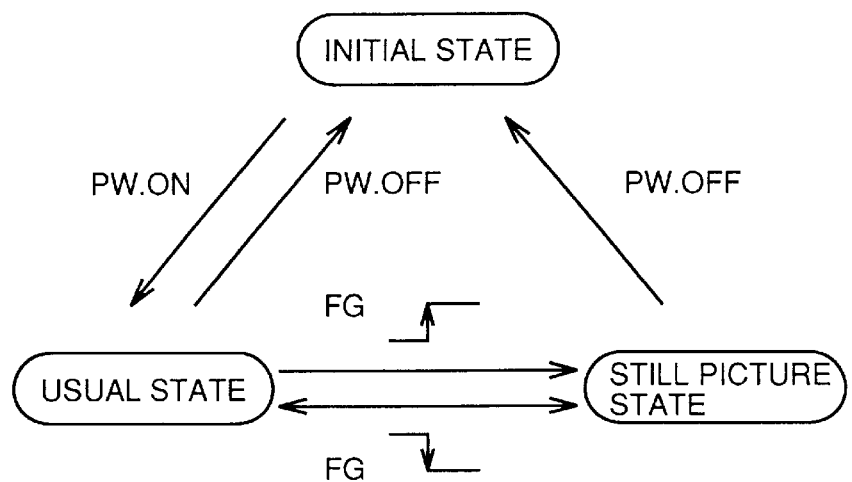
FIG. 2 is a diagram showing how the operation states of the TBC circuit transits.

FIG. 2 is a diagram showing transitions of the state of TBC circuit 100.

TBC circuit transits between the following three states in response to signal FG and turning on of the power supply.

1. The initial state in which the power supply of TBC circuit 100 is off.

2. The usual state in which an input video signal is input into the memory and subjected to time-base correction in real time to output as a video signal.

3. The still picture state in which the content of the memory is not updated and repeatedly converted into video signals to output.

Transitions between the three states are executed by turning ON/OFF of the power supply of TBC circuit 100 and in response to SG signal instructing a still picture to be taken in. If signal FG is at an "H" level, the still picture state is reached, and at an "L" level, the usual state is reached.

Now, according to the transition of states shown in FIG. 2, the operations of TBC circuit 100 will be described.

Figure 9:
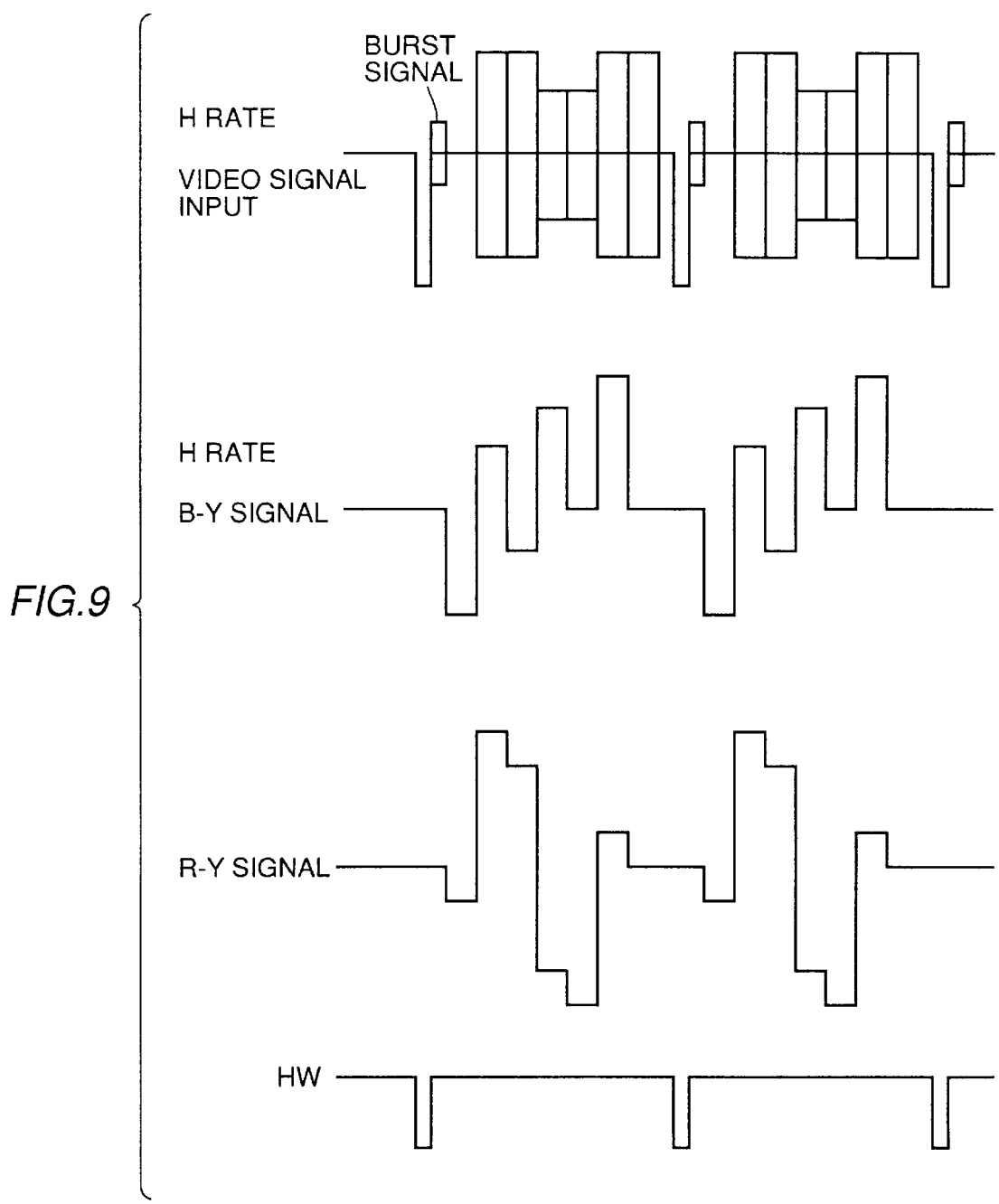
FIG. 9 is a timing chart for use in illustration of the change of main signals with time in the TBC circuit shown in FIG. 1.

FIG. 9 is a timing chart for use in illustration of the change of main signals with time in TBC circuit 100 in the usual state.

If, as a video signal input, the video signal shown in FIG. 9 is input, in other words if a signal having a color burst signal at the back porch of the horizontal blanking period is input, color demodulator 1 separates color difference signals B-Y and R-Y from the original video signal input for output. In this case, color difference signals B-Y and R-Y output from color demodulator 1 have been removed of a color burst signal.

Color difference signals B-Y and R-Y are analog-digital converted at A/D converters 3 and 4 and stored in memory circuit 4.

Writing operation to memory circuit 4 is controlled by memory controller 8 in synchronization with horizontal synchronizing signal HW and vertical synchronizing signal VW in the input video signal. More specifically, as shown in FIG. 9, in synchronization with horizontal synchronizing signal HW and vertical synchronizing signal VW (not shown in FIG. 9 because of the scale of time base) separated in synchronizing signal separation circuit 13, data is sequentially written in memory circuit 4 from the first address, starting from the fall of vertical synchronizing signal VW. Once writing of a video signal for 1 frame completes, writing is once again started sequentially from the first address in memory circuit 4 over the previous data.

More specifically, memory circuit 4 stores a video signal for 1 frame produced by sampling color difference signals B-Y and R-Y at a sampling rate of 7.159 MHz and quantizing the sampled signals at a quantizing precision of 8 bits using A/D converters 2 and 3.

Data reading from memory circuit 4 is controlled by memory controller 8, and performed in synchronization with horizontal synchronizing reference signal HR and vertical synchronizing reference signal VR output from reference signal generator 11.

The read out data is converted into analog signals by D/A converters 5 and 6, in other words converted into the original color difference signals R-Y and B-Y.

Figure 10A:
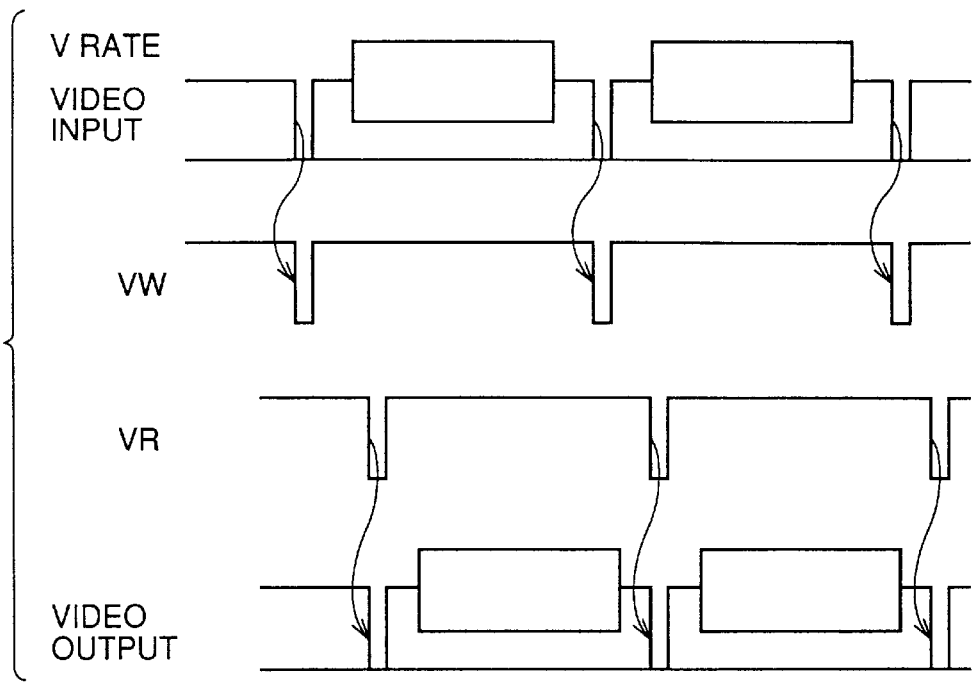
FIGS. 10A and 10B are timing charts showing the change of main signals with time if a color video signal is input to the TBC circuit, with FIG. 10A showing the change of a vertical synchronizing signal in time scale, while FIG. 10B the change of a horizontal synchronizing signal in time scale.
Figure 10B:
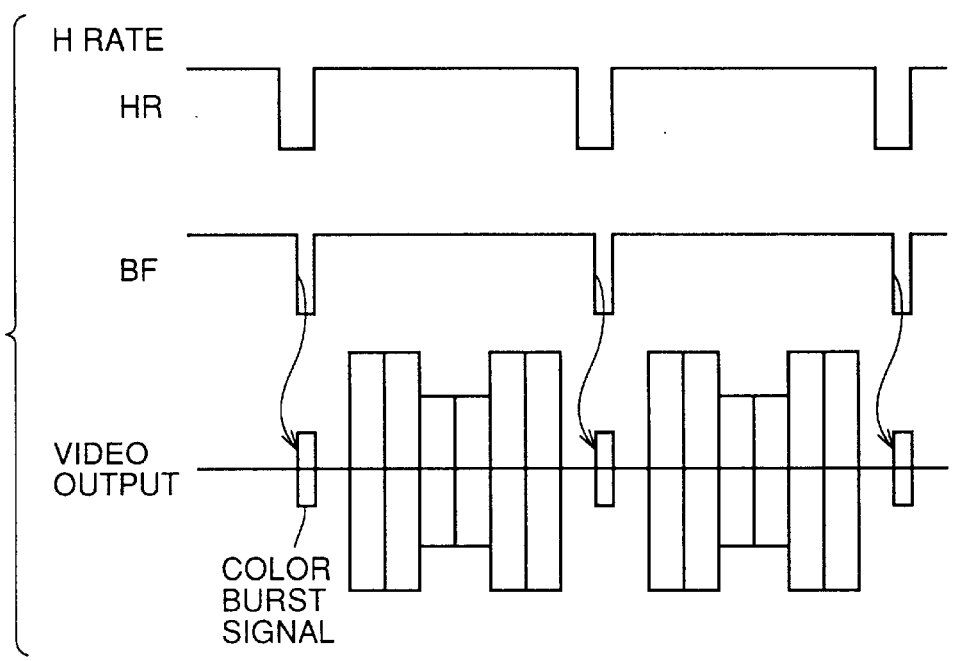

FIG. 10 is a timing chart for use in illustration of a video signal input and a video signal output in the usual operation, FIG. 10A shows the change of input/output of a video signal with time in view of the scale of the vertical synchronizing signal, and FIG. 10B shows the change of input/output of a video signal with time in view of the scale of the horizontal synchronizing signal.

With reference to FIG. 10A, data from a video signal input is written into memory circuit 4 in synchronization with vertical synchronizing signal VW separated in synchronizing signal separation circuit 13.

Meanwhile, in synchronization with vertical synchronizing reference signal VR output from reference signal generator 11, a video signal is output from encoder 7.

With reference to FIG. 10B, if there is a color burst signal in a video signal input, a color killer signal output from color demodulator 1 is at an "L" level. Meanwhile, in the usual state, signal FG is at an "L" level, and the color killer signal is output from analog switch 10 to OR gate 12. The BF pulse output from reference signal generator 11 is therefore directly output to encoder 7 as BF signal. In response to an activation of signal BF (change to an "L" level), encoder 7 adds a color burst signal to the video signal output. At the same time, encoder 7 outputs modulation signals based on color difference signals R-Y and B-Y as video signal outputs in synchronization with chrominance subcarrier SC.

Figure 11A:
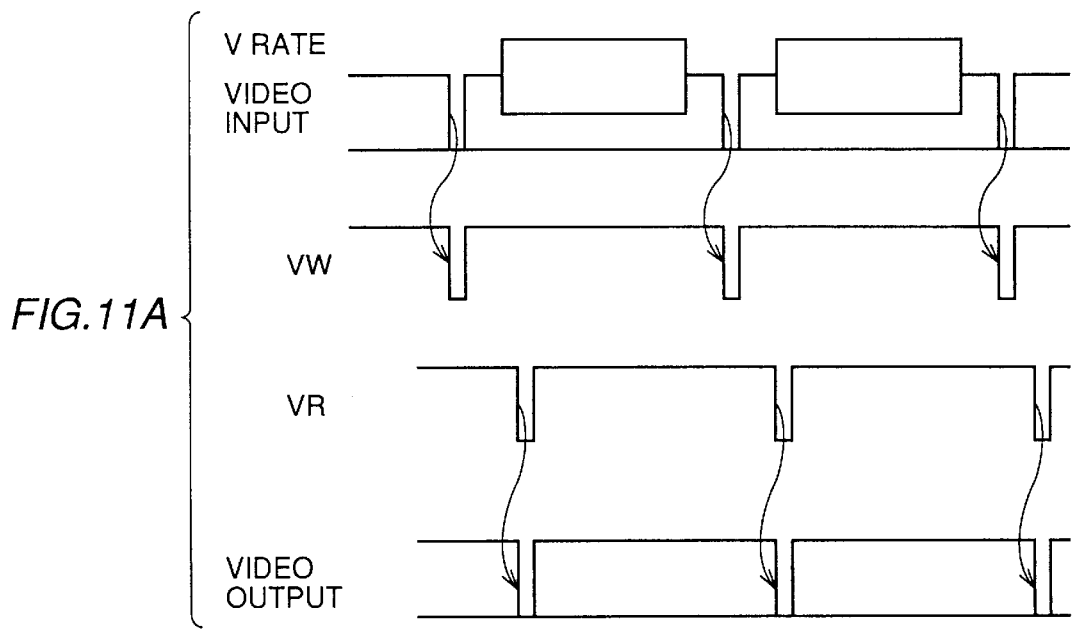
FIGS. 11A and 11B are timing charts showing the change of main signals with time if a monochrome video signal is input to the TBC circuit, with FIG. 11A showing the change of a vertical synchronizing signal in time scale, while FIG. 11B the change of a horizontal synchronizing signal in time scale.
Figure 11B:
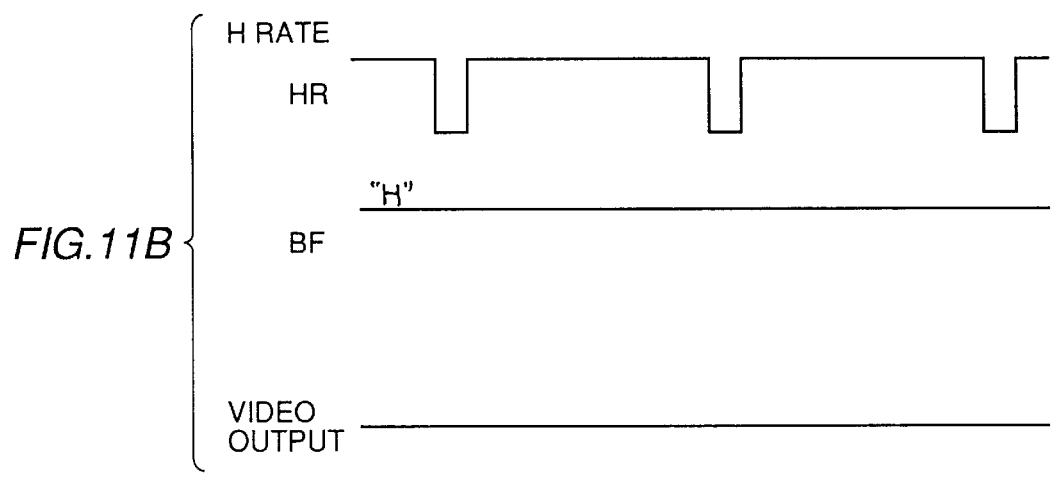

FIG. 11 is a timing chart for use in illustration of writing and reading operations of data to/from memory circuit 4 if a monochrome video signal is input as a video signal input, with FIG. 11A showing writing and reading operations on the scale of vertical synchronizing signal, while FIG. 11B showing reading operation on the scale of horizontal synchronizing signal.

As far as the operations on the scale of the vertical synchronizing signal are concerned, the waveforms of video signal outputs based on video signal inputs written and, read to/from memory circuit 4 are the same for the monochrome video signal and the color video signal except for the level of their color difference signal.

Meanwhile, as shown in FIG. 11B, if a video signal is read out from memory circuit 4 in synchronization with horizontal synchronizing reference signal HR output from reference signal generator 11, the color killer signal from color demodulator 1 is at an "H" level for input of a monochrome video signal, while in the usual state, as signal FG is at an "L" level, a signal output from switch circuit 10 to OR gate 12 also attains an "H" level.

BF pulse output from reference signal generator 11 is therefore suppressed at OR gate 12, which keeps signal BF in active. A video signal output from encoder 7 is therefore not added with a color burst signal.

As in the foregoing, in the usual operation, TBC circuit 100 shown in FIG. 1 adds a color burst signal to a signal to be output if an input video signal is a color video signal, and directly outputs an input monochrome video signal without adding a color burst signal thereto.

If, therefore, the signal output from TBC circuit 100 is reproduced at the TV receiver, the reproduced picture will not have any color noises if the video signal is a monochrome video signal.

Now the operations of TBC circuit 100 when a video signal is output in the still picture state will be described.

In the usual state in which signal FG is at an "H" level, a transition to the still picture state occurs as signal FG attains an "H" level.

Flip-flop circuit 9 holds the level of a killer out signal from color demodulator 1 when signal FG attains an active state ("H" level). Analog switch 10 has its b side selected in response to signal FG attaining an "H" level, and provides an output from flip-flop circuit 9 to OR gate 12.

Meanwhile, memory controller 8 prohibits writing operation to memory circuit 4 in response to signal FG attaining an "H" level after writing of a video signal for 1 frame to memory circuit 4 completes.

If signal FG attains an active state, and a video signal input to TBC circuit 100 is a color video signal, the level of an output signal from flip-flop circuit 9 is at an "L" level, and burst flag pulse BFP output from reference signal generator 11 is directly output to encoder 7 as signal BF.

Therefore, as with the case of usual operation, video signals read out from memory circuit 4 in synchronization with signals HR and VR are added with color burst signals in synchronization with an activation of signal BF.

In the still picture state, since writing of data to memory circuit 4 is prohibited, image information for the same 1 frame stored in memory circuit 4 continuous to be output until the still picture state is canceled.

If signal FG attains an active state and an input video signal is a monochrome signal, the color killer signal from color demodulator 1 is at an "H" level. The level of a signal output from flip-flop circuit 9 is therefore also at an "H" level, and the output of OR circuit 12 which receives the signal as one input always attains an inactive "H" level irrespectively of the value of BF pulse from reference signal generator 11 applied to the other input.

Therefore, the video signal output from encoder 7 is not added with a color burst signal.

More specifically, TBC circuit 100 adds a color burst signal to a signal to be output if an input video signal is a color video signal even in the still picture output state, while outputs the video signal without adding a color burst signal if the input signal is a monochrome video signal.

As in the foregoing, TBC circuit 100 according to the first embodiment, outputs a video signal without a color burst signal if an input signal is without a burst signal in the usual state, while adds a color burst signal to an output signal if an input video signal has a color burst signal.

Also in the still picture output state, TBC circuit 100 stores the presence/absence of a color burst signal in a video signal corresponding to a frame specified by signal FG, and thus automatically switches whether or not to add a color burst signal to a still picture signal to output.

A color burst signal is added to an output video signal based on the presence/absence of a color burst signal in an input video signal, and therefore a monochrome video signal without a color burst signal is input as an input video signal, the resolution of a reproduced picture may be prevented from deteriorating because of the influence of the color burst signal.

Second Embodiment

In TBC circuit 100 according to the first embodiment, based on if an input video signal is a color video signal or a monochrome video signal, a video signal to be output is added with a color burst signal.

If, therefore, the video signal to be input is a video signal corresponding to a black level signal, addition of a color burst signal is automatically avoided, and therefore a black burst signal cannot be output from TBC circuit 100.

In a second embodiment, a TBC circuit 200 capable of outputting a black burst signal is presented.

Figure 13:
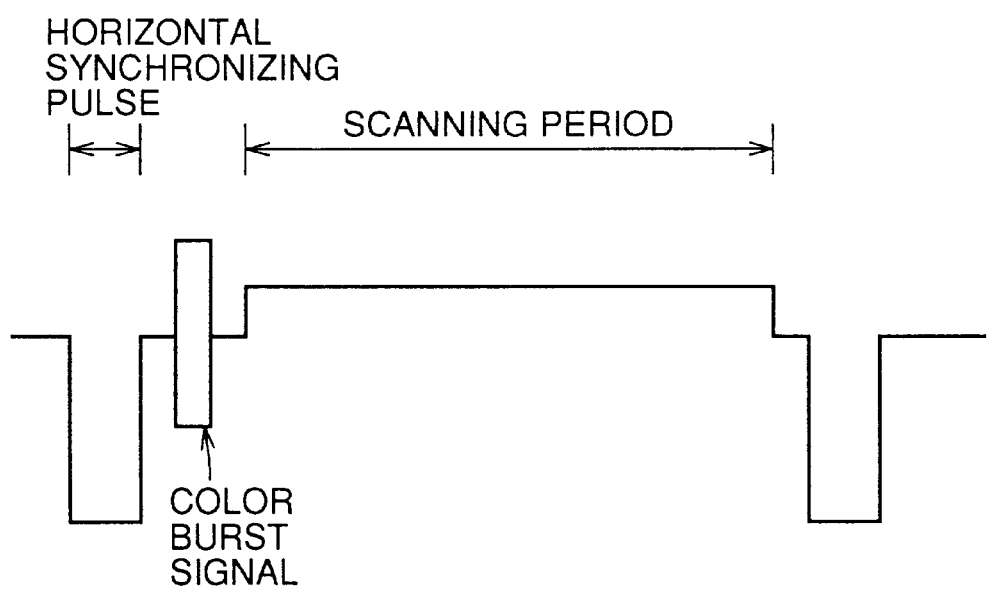
FIG. 13 is a waveform chart showing a black burst signal.

FIG. 13 is a waveform chart showing the waveform of a black burst signal.

The black burst signal has a color burst signal in the back porch of the horizontal blanking period, and during the scanning period the signal is at a black level.

Figure 12:
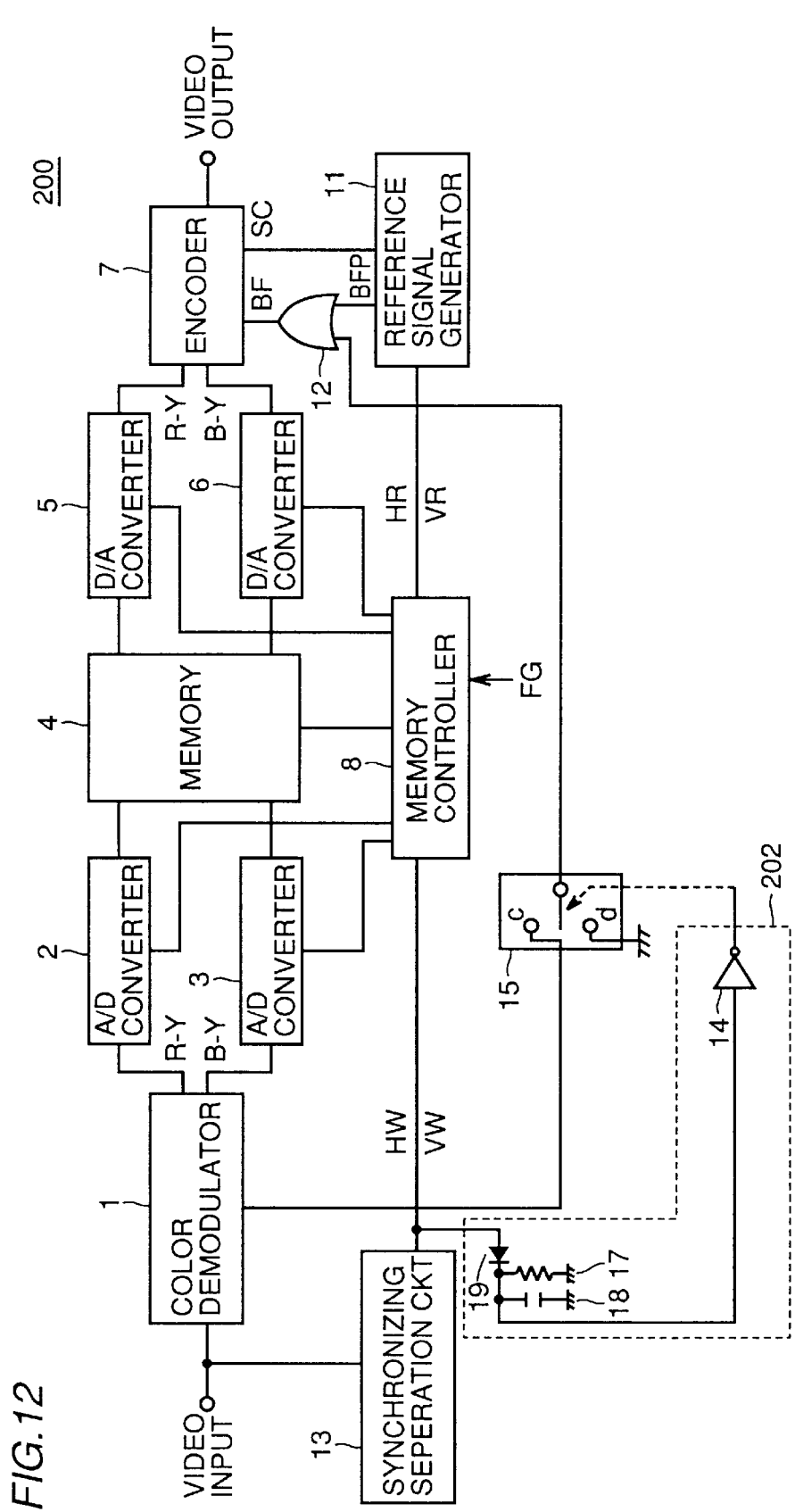
FIG. 12 is a block diagram showing the structure of a TBC circuit according to a second embodiment of the invention.

FIG. 12 is a schematic block diagram showing the structure of TBC circuit 200 according to the second embodiment.

The structure of TBC circuit 200 is different from TBC circuit 100 in the following three points.

First, TBC circuit 200 includes a video signal input detection circuit 202 for detecting whether or not a video signal is input.

Second, a killer out signal output from color demodulator 1 is input to one input node of OR gate 12 through an analog switch 15 controlled by video signal input detection circuit 202. At the time, analog switch 15 outputs a killer out signal if a video signal is input, and outputs a signal of an "L" level corresponding to an active killer out signal if a video signal is not input.

Third, signal FG is directly input to memory controller 8. Flip-flop circuit 9 and analog switch 10 in TBC circuit 100 according to the first embodiment are not provided in TBC circuit 200.

Since the other structures are the same as TBC circuit 100, and therefore the same or corresponding portions are denoted with the same or corresponding reference numerals and characters with description thereof being omitted.

Video signal input detection circuit 202 includes a diode 19 receiving horizontal synchronizing signal SW and vertical signal synchronizing signal VW output from the synchronizing signal separation circuit at its anode, a resistor 17 connected between the cathode of diode 19 and ground node, a capacitor 18 connected in parallel to resistor 17 and between the cathode of diode 19 and the ground node and an inverter 14 for supplying a control signal to analog switch 15 in response to the potential of the cathode of diode 19.

More specifically, if a video signal is input, signals HW and VW output from synchronizing signal separation circuit 13 are at an "H" level in a longer period than the period in which they are at an "L" level, and therefore one end of the capacitor connected with the cathode of diode 19 is charged to an "H" level. A control signal at an "L" level is output from inverter 14 and analog switch 15 has its c side selected. OR gate 12 is therefore supplied with a killer out signal from color demodulator 1.

Meanwhile, if a video signal is not input, the one end of capacitor 18 connected with the cathode of diode 19 is discharged to an "L" level. A control signal output from inverter 14 therefore attains an "H" level, and analog switch 15 has its d side selected. A signal at an "L" is output from analog switch 15 to one input node of OR gate 12 as a result.

Now, the operations of TBC circuit 200 will be described. If a video signal is input, analog switch 15 has its c side selected as described above, and the killer out signal from color demodulator 1 is supplied to the one input node of OR gate 12.

If therefore the input video signal is a color video signal, the killer out signal attains an active state ("L" level) and signal BF is output from OR gate 12 to encoder 7 based on burst flag pulse BFP output from reference signal generator 11. A video signal output from encoder 7 is added with a color burst signal based on signal BF.

Meanwhile, if the input video signal is a monochrome signal, the killer out signal from color demodulator 1 attains an inactive state ("H" level). Always inactive signal BF ("H" level) is output from OR gate 12, and a video signal output from encoder 7 is not added with a color burst signal.

Therefore, at the time of video signal input, as with the case of TBC circuit 100 according to the first embodiment, based on the presence/absence of a color burst signal in an input video signal, a color burst signal is added to a video signal to be output.

The operations when input of a video signal is stopped and an active signal FG is applied to memory controller 8 will be described.

Color difference signals R-Y and B-Y corresponding to a black level are output from demodulator 1 because there is no video signal input. Black level digital signals corresponding to one frame are output from A/D converters 2 and 3 to memory circuit 4, and then memory controller 8 prohibits writing operation to memory circuit 4. In memory circuit 4, the digital signals corresponding to the black level are stored in the addresses corresponding to all the pixels. This is equivalent to clearing of the storage information in memory circuit 4.

Then, signals R-Y and B-Y output from D/A converters 5 and 6 in synchronization with signals HR and VR output from reference signal generator 11 continue to be signals corresponding to the black level until the still picture output state is canceled in response to signal FG.

Meanwhile, since there is no video signal input, an "L" level signal is output from analog switch 15. Signal BF is therefore output from OR gate 12 to encoder 7 in response to BF pulse output from reference signal generator 11. Encoder 7 therefore outputs a signal added with a color burst signal at its back porch and its signal level during the scanning period corresponding to the black level, in other words a black burst signal.

As described above, in TBC circuit 200, the operation state to output a black burst signal is reached in response to externally applied signal FG at an arbitrary point during the operation.

The operations will be described when the power supply of TBC circuit 200 is turned off which renders TBC circuit 200 into an initial state, then the power supply switch is once again turned on and the usual state is reached again. At the time, the storage content of memory circuit 4 is cleared because of the initial state. More specifically, memory circuit 4 is generally formed of a volatile semiconductor memory, and therefore, turning off of the power supply clears all the storage information. In this state, if TBC circuit 200 is operated in the usual state without inputting a video signal, an "L" level signal is output from analog switch 15, signal BF corresponding to BF pulse is output from OR gate 12, and therefore a black burst signal will be output from encoder 7.

In TBC circuit 200 according to the second embodiment, if a video signal is not input in the initial state at the time of turning on the power supply, a black burst signal may be generated.

TBC circuit 200 may a generate a black burst signal by scanning FG signal if a video signal is no longer input in the usual state.

If an input video signal has a burst signal, an output video signal is also added with a burst signal, while if an input video signal has no burst signal, an output video signal is not added with a burst signal. If a monochrome video signal is input, color noises are not generated in reproducing an output video signal.

Third Embodiment

Figure 14:
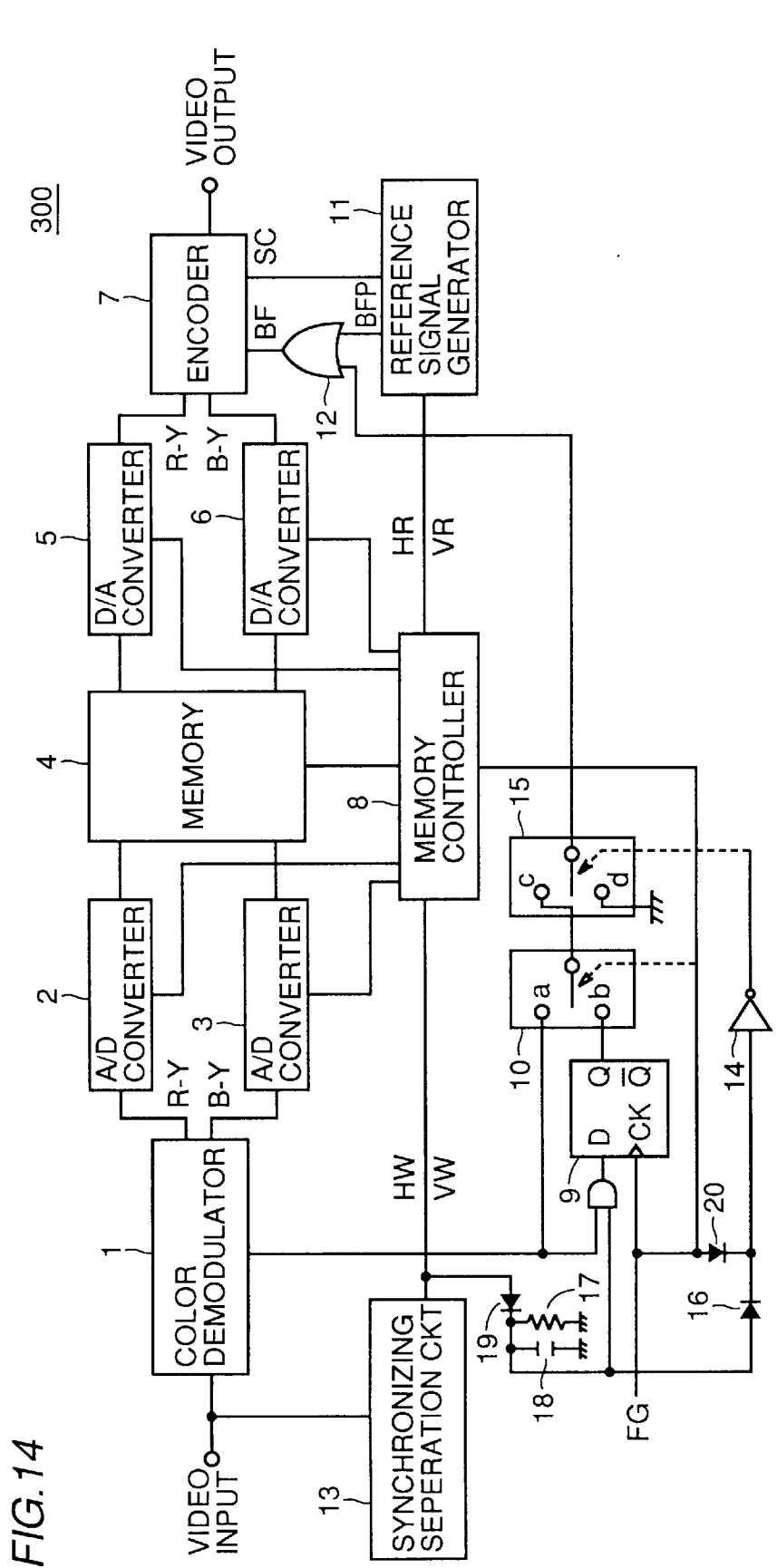
FIG. 14 is a schematic block diagram showing the structure of a TBC circuit according to a third embodiment of the invention.

FIG. 14 is a schematic block diagram showing the structure of a TBC circuit 300 according to a third embodiment of the invention.

The third embodiment is different from TBC circuit 200 according to the second embodiment in that TBC circuit 300 includes a flip-flop circuit 9 for storing and holding the logical product level of a killer out signal and an output of the video signal input detection circuit 202 at the point in which signal FG turns into its active state, and an analog switch 10 switching between the killer out signal itself and the level of the killer out signal stored in flip-flop circuit 9 and supplying the selected one to an input node on the c side of analog switch 15.

Because of such a structure, the input node of inverter 14 is connected with the cathode of diode 16 and the cathode of diode 20 receiving signal FG at its anode. The anode of diode 16 is connected with the cathode of diode 19.

TBC circuit 300 according to the third embodiment may thus add a color burst signal to an output video signal based on if the video signal is a monochrome signal or a color video signal when a still picture video signal is output.

Now, the operation will be described.

(i) The operation in the usual state if a video signal is input.

In this case, based on signals HW and VW output from synchronizing signal separation circuit 13, the potential level of one input terminal of capacitor 18 connected with the cathode of diode 19 attains an "H" level. A control signal output from inverter circuit 14 attains an "L" accordingly, and the c side of analog switch 15 is selected. Meanwhile, since signal FG is at an "L" level, the a side of analog switch 10 is selected. A killer out signal from color demodulator 1 is therefore supplied to one input node of OR gate 12.

If a monochrome video signal is input in this state, with the killer out signal being at an "H" level, an always inactive ("H" level) signal BF is supplied from OR gate 12 to encoder 7. The video signal output from encoder 7 is therefore not added with a color burst signal.

If an input video signal is a color video signal, a killer out signal from color demodulator 1 is in an active state ("L" level), signal BF based on burst flag pulse BFP from reference signal generator 11 is supplied to encoder 7 from OR gate 12. The output video signal is therefore added with a color burst signal as a result.

As described above, in the usual operation, the video signal output from TBC circuit 300 is added with a color burst signal based on whether the input video signal is a monochrome video signal or a color video signal. If therefore a monochrome video signal output from TBC circuit 300 is reproduced, color noises are not generated.

(ii) The operations in the usual state to output a still picture

In this case, since a video signal is input, the c side of analog switch 15 is selected. At the point at which signal FG is pulled to an active state "H" level, if the input video signal is a monochrome signal, flip-flop circuit 9 holds the level of a killer out signal at an "H" level. Meanwhile, in response to signal FG attaining an "H" level, the b side of analog switch 10 is selected, and as a result an output signal from flip-flop circuit 9 is supplied to one input node of OR circuit 12.

In response to signal FG being pulled to "H" level, memory controller 8 prohibits writing operation to memory circuit 4 after memory circuit 4 stores one frame of color different signals R-Y and B-Y output from A/D converters 2 and 3, respectively. Thereafter, the picture information for one frame at the point of signal FG being inactivated is repeatedly converted into color difference signals R-Y and B-Y and input to encoder 7.

If an input video signal at the point of signal FG attaining an active state is a monochrome signal, an "H" level signal is output from flip-flop circuit 9, an always inactive signal BF is supplied from OR gate 12 to encoder 7. An output still picture video signal is therefore not added with a color burst signal.

Meanwhile, if a video signal input at the point of signal FG being activated is a color video signal, an "L" level signal is output from flip-flop circuit 9, and therefore signal BF corresponding to burst flag pulse BFP from reference signal generator 11 is supplied from OR gate 12 to encoder 7. A video signal for a still picture to be output is added with a color burst signal as a result.

If a video signal corresponding to a still picture is output in the usual operation state, a color burst signal is added based on weather the still picture signal is a monochrome video signal or a color video signal.

(iii) If a black burst signal is output based on signal FG

The operations will be described when input of a video signal is stopped and signal FG is activated in the usual state.

In this case, since a video signal is not input, a signal output from inverter circuit 14 attains an "H" level, and an "L" level signal is supplied from analog switch 15 to one input node of OR gate 12.

In this state, an output video signal is added with a color burst signal in encoder 7.

Meanwhile, since there is no input video signal, color difference signals R-Y an B-Y corresponding to the black level are output from color demodulator 1. In response to signal FG attaining an "H" level, memory controller 8 prohibits writing operation to the memory circuit after the color difference signals corresponding to the black level for one frame are stored in memory circuit 4. Therefore, D/A converters 5 and 6 thereafter output signals corresponding to the black level to encoder 7. As described above, since encoder 7 adds a color burst signal to the signals and produces a video signal output, the signal output from encoder 7 becomes a black burst signal.

TBC circuit 300 may output a black burst signal by pulling signal FG to an "H" level in the state in which input of a video signal is stopped.

Also in TBC circuit 300, after the power supply is turned off into an initial state, turning on of the power supply may clear the storage information within memory circuit 4. In this case, as with the case of TBC circuit 200 according to the second embodiment, a black burst signal may be output by rising signal FG, with input of a video signal being stopped.

In TBC circuit 300, a black burst signal is generated if a video signal is not input in the initial state at the time of turning on the power supply.

If a video signal is no longer input in the usual state, a black burst signal may be generated by scanning signal FG.

If a burst signal is present in an input video signal, a burst signal is added both for outputting a series of video signals and for outputting a video signal for a still picture, and if there is no burst signal in an input video signal, a video signal may be output without adding a burst signal both for outputting a series of video signals and for outputting a still picture.

As a result, color noises will not appear if a monochrome video signal output from TBC circuit 300 is reproduced.

Fourth Embodiment

Figure 15:
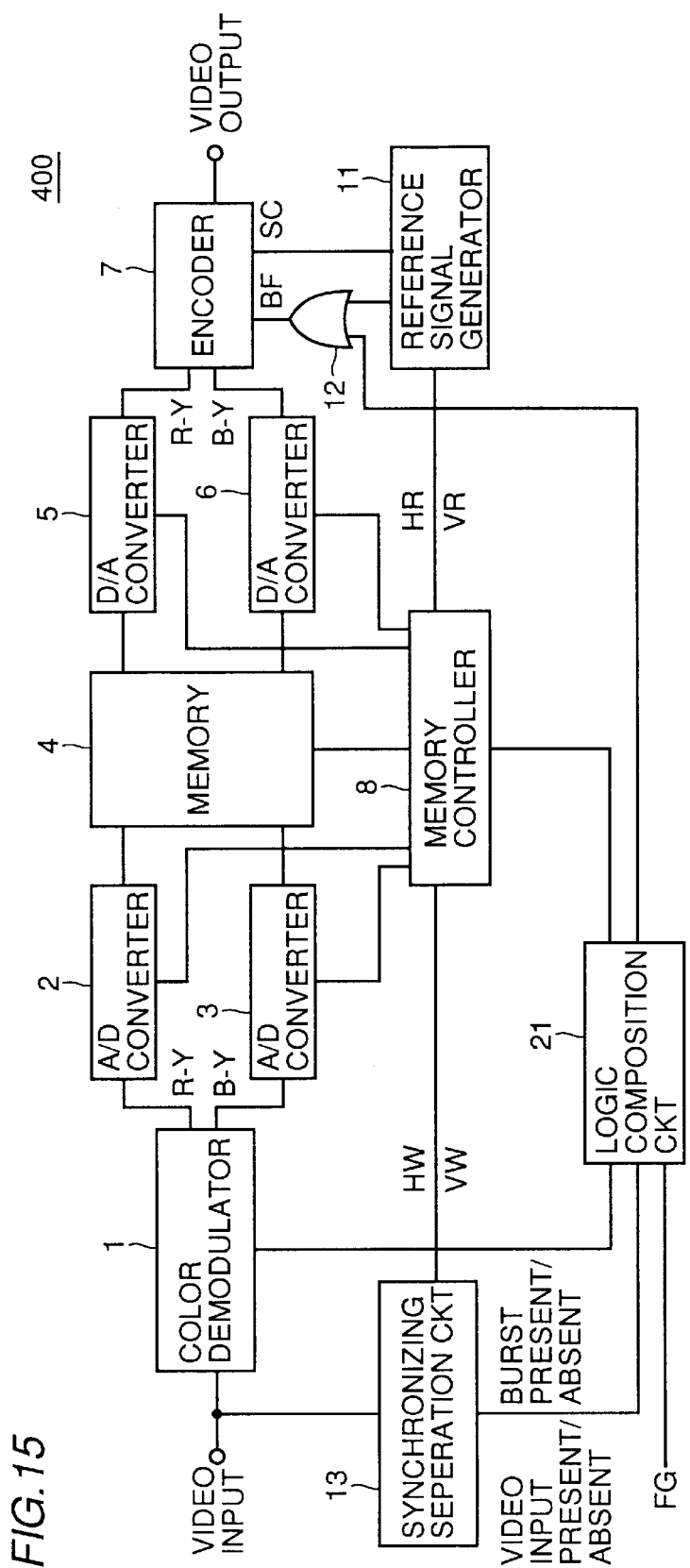
FIG. 15 is a schematic block diagram showing the structure of a TBC circuit according to a fourth embodiment of the invention.

In the third embodiment, the analog switch is selected based on whether or not a video signal is input, a burst signal is present in an input signal, and signal FG is in an active state. On the other hand, TBC circuit 400 according to a fourth embodiment shown in FIG. 15 has its operation state controlled by a logic operation circuit 21.

Logic operation circuit 21 controls the control operation of memory controller 8 and addition of a burst signal based on the presence/absence of an input burst signal and on the presence/absence of an activation of FG signal.

Figure 16:
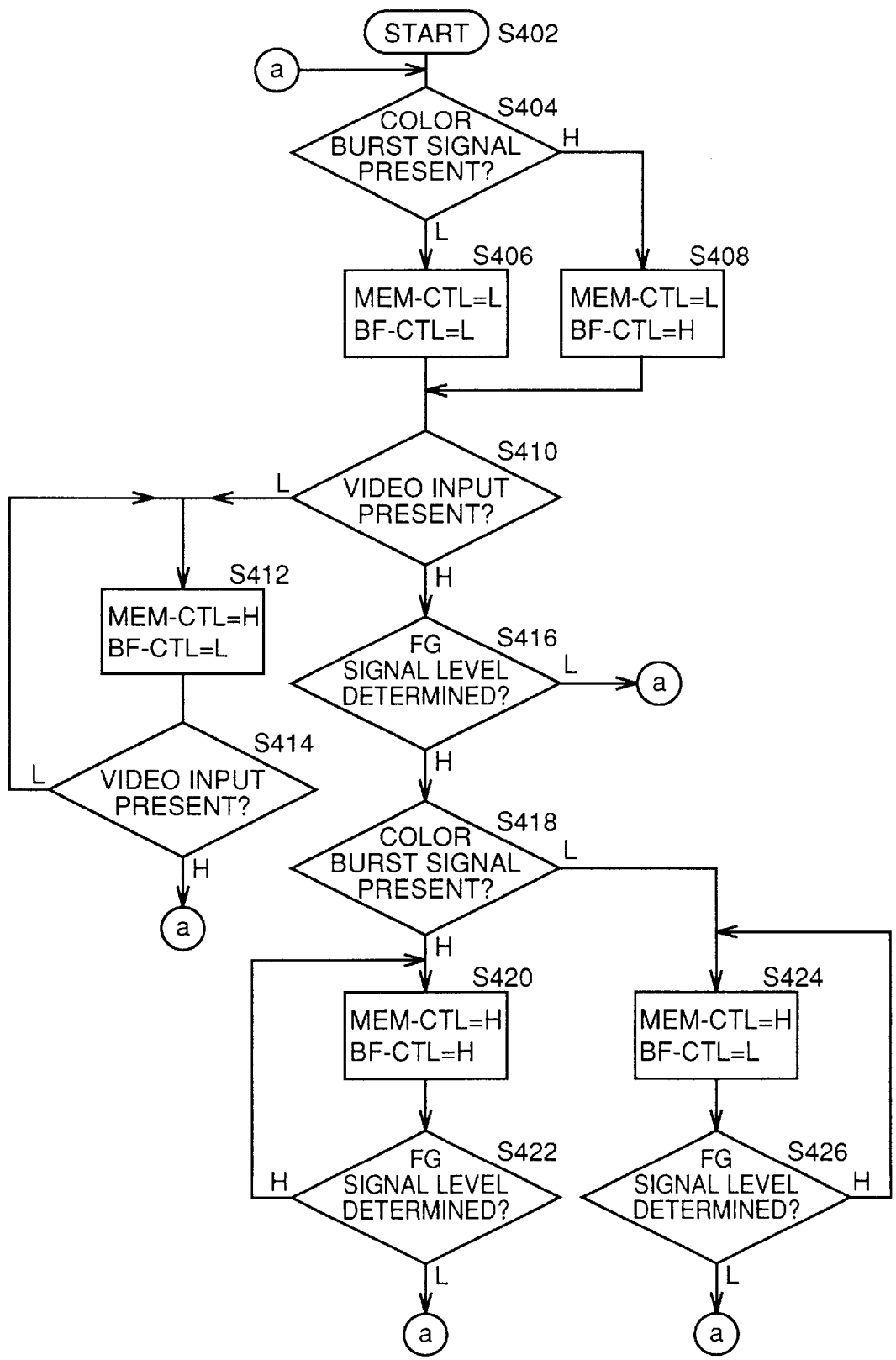
FIG. 16 is a flow chart for use in illustration of the operation of logic operation circuit 21 and the TBC circuit shown in FIG. 15.
Figure 17:
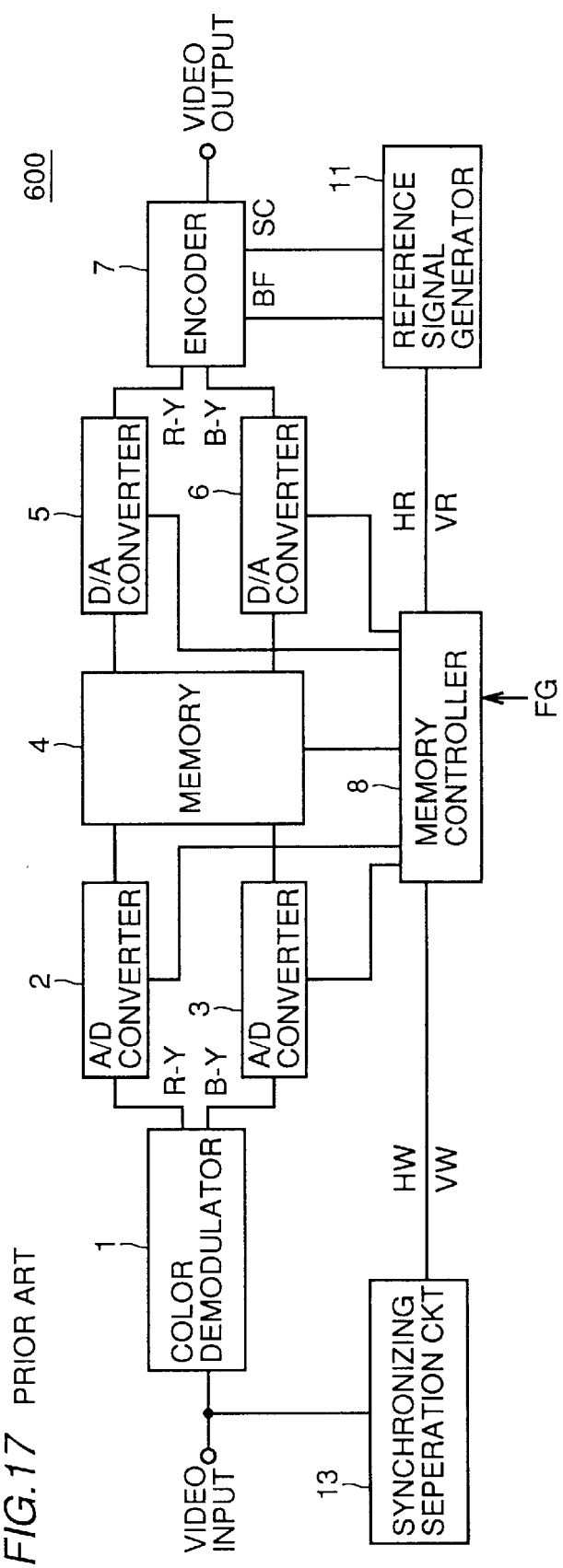
FIG. 17 is a schematic block diagram showing the structure of a conventional TBC circuit.
Figure 18:
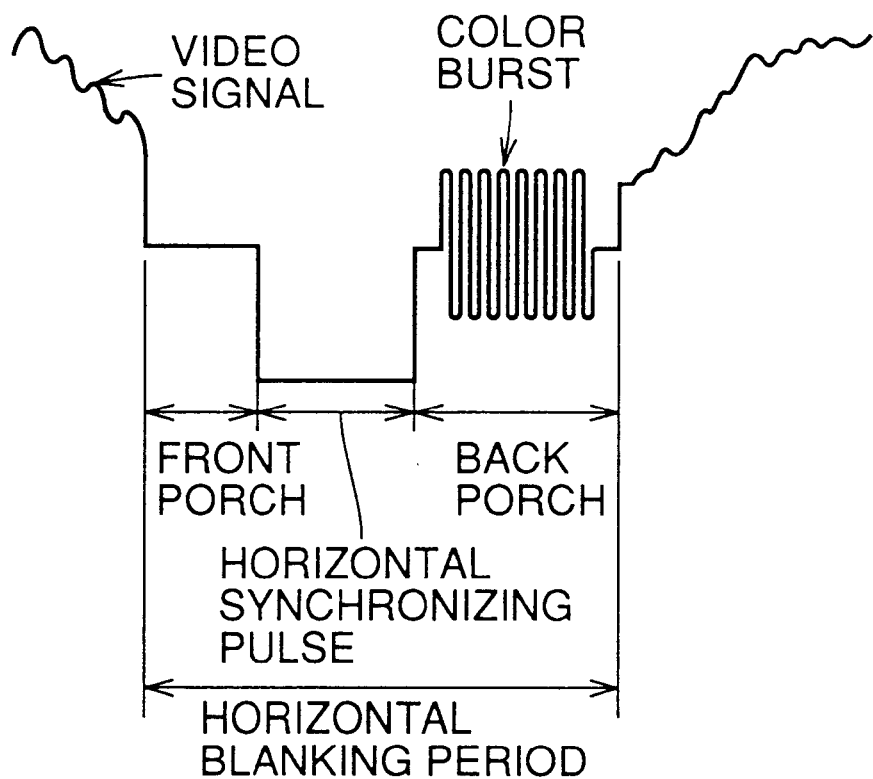
FIG. 18 is a signal waveform chart showing a color video signal with its horizontal blanking period being enlarged.

FIG. 16 is a flow chart for use in illustration of the operation of logic operation circuit 21. When the processing of logic operation circuit 21 starts (step S402), it is determined whether or not a burst signal is present in an input video signal based on a killer out signal from color demodulator 1 (step S404).

Logic operation circuit 21 pulls signal MEM-CTL to an "L" level and signal BF-CTL to an "L" level once it is determined that a burst signal is added (step S406).

Meanwhile, if it is determined that a burst signal is not added to the input signal, logic operation circuit 21 pulls signal MEM-CTL to an "L" level and signal BF-CTL to an "H" level (step S408).

Signal MEM-CTL is applied to memory controller 8, and if the signal is at an "H" level, memory controller 8 pulls signal WE to an "H" level, in order to prohibit writing of data to memory circuit 4.

Signal BF-CTL is applied to one input node of OR gate 12, and if the signal is at the "H" level, signal BF supplied to encoder 7 is always in an inactive state.

Then, based on a signal from synchronizing signal separation circuit 13, logic operation circuit 21 determines whether or not a video signal is input (step S410).

i) If it is determined that no video signal is input

In this case, signal MEM-CTL is set to an "H" level, and signal BF-CTL to an "L" level (step S412).

Then, it is determined whether or not there is a video input (step S414), and an endless loop is formed by steps S412 and S414 until a video signal is input.

If the processing of logic composition circuit 21 is within the endless loop, memory controller 8 prohibits writing operation to memory circuit 4 after a black level color difference signal for one frame is written, and therefore a black level signal added with a burst signal, in other words a black burst signal continues to be output from encoder 7.

In steps S414, if it is determined that there is a video signal input, the processing returns to step S404.

ii) If it is determined that there is a video signal input in step S410, the level of signal FG is then determined (S416). If signal FG is determined to be at an "L" level, the processing once again returns to step S404. In this state, if an input video signal is a monochrome signal, signal BF-CTL is at an "H" level, and for a color video signal, signal BF-CTL is at an "L" level, and an endless loop is formed by steps S404, S406 or S408, S410 and S416.

More specifically, if video signals are sequentially input, and each input video signal is added with a color burst signal, signal BF-CTL attains an "L" level, and signal BF corresponding to BF pulse from reference generator 11 is supplied to encoder 7 through OR gate 12. Stated differently, an output video signal is added with a color burst signal.

Meanwhile, if video signals are sequentially input and a color burst signal is not present in an input video signal, signal BF-CTL attains an "H" level, and an always inactive signal BF is supplied to encoder 7 from OR gate 12. Stated differently, an output video signal is not added with a color burst signal.

If it is determined that signal FG is in an active state ("H" level) in step S416, it is determined whether or not a burst signal is added to an input video signal based on a killer out signal from color demodulator 1, (step S418).

If it is determined that a burst signal is not added, logic operation circuit 21 pulls signal MEM-CTL to an "H" level, and signal BF-CTL to an "H" level (step S420).

Memory controller 8 prohibits writing of data to memory circuit 4 after color difference signals for one frame are stored in memory circuit 4 in response to signal MEM-CTL being pulled to an "H" level.

Meanwhile, in response to signal BF-CTL being pulled to the "H" level, an inactive signal BF is supplied to encoder 7. Therefore, image information for one frame at the point at which signal FG stored in memory circuit 4 is activated is output without a color burst signal added.

Then, it is determined whether or not signal FG is in an active state or in an inactive state (S422). If signal FG is determined to be in an active state, the processing transits to step 420, and during the period in which signal FG is active, an endless loop is formed by steps S420 and S422, the same still picture signal continues to be output.

If signal FG is determined to be inactive in step S422, the processing returns to step S404.

If it is determined that a color burst signal is added in step S418, logic composition circuit 21 pulls signal MEM-CTL to an "H" level and signal BF-CTL to an "L" level (step S424).

In response to signal MEM-CTL being pulled to the "H" level, memory controller 8 prohibits data writing to memory circuit 4 after color difference signals for one frame at the point at which signal FG is activated are stored in memory circuit 4.

Signal BF corresponding to BF pulse output from reference signal generator 11 is supplied to encoder 7 in response to signal BF-CTL being pulled to "L" level.

Therefore, a still picture signal output from encoder 7 is added with a burst signal.

Then, it is determined whether or not signal FG is in an inactive state (step S426).

If signal FG is determined to be in an active state, processing transits to step S424, and an endless loop is formed by steps S424 and S426. Therefore, during the period in which signal FG is active, a still picture signal added with a burst signal is output.

If signal FG is determined to be inactive (step S426), the processing returns to step S404.

As in the foregoing, in TBC circuit 400 according to the fourth embodiment, the same operations as the TBC circuit according to the third embodiment are achieved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A time-base corrector having the function of outputting a still picture, comprising:

a reference signal generator for outputting a reference frequency signal;

a synchronizing signal separation circuit receiving a video signal for separating a synchronizing signal therefrom;

a color signal demodulator receiving said video signal for reproducing a color signal,
said color signal demodulator including a burst detection circuit for detecting the presence/absence of a color burst signal in said video signal;

an A/D converter receiving said color signal for converting said received color signal into a digital signal in synchronization with said synchronizing signal;

a memory for storing said digital signal;

a memory controller for controlling writing operation of said digital signal to said memory in synchronization with said synchronizing signal, and controlling reading operation of said digital signal from said memory in synchronization with said reference frequency signal, said memory controller prohibiting writing operation to said memory in response to an activation of an externally applied control signal, after said digital signal corresponding to said video signal for one picture frame is stored in said memory;

a D/A converter for sequentially reading out said digital signal from said memory in synchronization with said reference frequency signal and converting the read out digital signal into an analog signal;

a burst signal addition circuit for adding a color burst signal to an output signal from said D/A converter in synchronization with said reference frequency signal based on a result of detection of said burst detection circuit; and a holding circuit for holding the result of detection of said burst detection circuit when said control signal is activated, said memory controller controlling writing operation to said memory based on an output from said holding circuit.

2. The time-base corrector as recited in claim 1, further comprising:

a switch circuit receiving the output from said holding circuit and the result of detection of said burst detection circuit for selecting the output from said holding circuit during the period in which said control signal is active, and the result of detection of said burst detection circuit during the period in which said control signal is inactive and outputting the selected signal as an addition instruction signal, said burst signal addition circuit adding a burst signal to an output signal from said D/A converter in synchronization with said reference frequency signal in response to said addition instruction signal.

3. A time-base corrector having the function of outputting a still picture, comprising:

a reference signal generator for outputting a reference frequency signal;

a video signal input terminal receiving an externally applied video signal;

a video signal input detection circuit for detecting the presence/absence of input of said video signal to said video signal input terminal;

an internal synchronizing signal generation circuit receiving a signal from said video signal input terminal for outputting an internal synchronizing signal, said internal synchronizing signal generation circuit separating a synchronizing signal from said video signal and outputting said internal synchronizing signal if said video signal is input, while outputting said internal synchronizing signal of a prescribed frequency if said video signal is not input;

a color signal demodulator receiving said video signal for reproducing a color signal, said color signal demodulator reproducing a color signal from said video signal if said video signal is input, and outputting a color signal corresponding to a black level if said video signal is not input;

an A/D converter receiving the color signal output from said color signal demodulator for converting said received color signal into a digital signal in synchronization with said synchronizing signal;

a memory for receiving said digital signal and storing said digital signal;

a memory controller for controlling writing operation of said digital signal to said memory in synchronization with the internal synchronizing signal output from said internal synchronizing signal generation circuit, and controlling reading operation of said digital signal from said memory in synchronization with said reference frequency signal, said memory controller prohibiting writing operation to said memory in response to an activation of an externally applied control signal after stored information in said memory is cleared;

a D/A converter for sequentially reading out said digital signal from said memory in synchronization with said reference frequency signal and converting said read digital signal into an analog signal;

a burst signal addition circuit for adding a color burst signal to an output signal from said D/A converter in synchronization with said reference frequency signal if a video signal is not input based on a result of detection of said video signal input detection circuit;

said memory controller clearing stored information in said memory by inputting said digital signal corresponding to one picture frame, after said control signal is activated;

said color signal demodulator including a burst detection circuit detecting the presence/absence of a color burst signal in said video signal;

said burst signal addition circuit adding a color burst signal to an output signal from said D/A converter in synchronization with said reference frequency signal based on a result of detection of said burst detection circuit if a video signal is input; and a holding circuit for holding the result of detection of said burst detection circuit when said control signal is activated.

* * * * *